(12) United States Patent
Ham et al.

(10) Patent No.: US 11,321,556 B2
(45) Date of Patent: May 3, 2022

(54) PERSON RE-IDENTIFICATION APPARATUS AND METHOD

(71) Applicant: INDUSTRY-ACADEMIC COOPERATION FOUNDATION, YONSEI UNIVERSITY, Seoul (KR)

(72) Inventors: Bum Sub Ham, Seoul (KR); Chan Ho Eom, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 72 days.

(21) Appl. No.: 17/003,990

(22) Filed: Aug. 27, 2020

(65) Prior Publication Data

US 2021/0064853 A1 Mar. 4, 2021

(30) Foreign Application Priority Data

Aug. 27, 2019 (KR) .................. 10-2019-0104887

(51) Int. Cl.
*G06K 9/00* (2006.01)
*G06K 9/62* (2022.01)
*G06K 9/46* (2006.01)

(52) U.S. Cl.
CPC ....... *G06K 9/00288* (2013.01); *G06K 9/4671* (2013.01); *G06K 9/6257* (2013.01); *G06K 9/6262* (2013.01)

(58) Field of Classification Search
CPC ............ G06K 9/00288; G06K 9/4671; G06K 9/6257; G06K 9/6262; G06K 9/00771; G06K 9/46; G06K 9/627; G06K 9/00362; G06K 9/481; G06K 9/6201; G06N 20/00; G06T 5/50

See application file for complete search history.

(56) References Cited

U.S. PATENT DOCUMENTS 10,417,532 B2 * 9/2019 Liang .................. G06K 9/6215
11,080,483 B1 * 8/2021 Islam .................... G06F 16/35
(Continued)

FOREIGN PATENT DOCUMENTS

| JP | 2016-071502 A | 5/2016 |
| JP | 2018-147392 A | 9/2018 |
| KR | 10-2019-0068000 A | 6/2019 |

OTHER PUBLICATIONS

Eom et al., "Learning Disentangled Representation for Robust Person Re-identification", Nov. 2019 (Year: 2019).*

*Primary Examiner* — Aaron W Carter

(57) ABSTRACT

The present disclosure can provide a person re-identification apparatus and method that includes an identity feature extraction part configured to receive a multiple number of images each including a person requiring re-identification, extract features related to an identity of a person included in each image according to a pattern estimation method learned beforehand, and obtain an identity-related feature vector for each image; and a re-identification determination part configured to analyze a degree of similarity between an identity-related feature vector obtained for a base image including a search target from among the plurality of images and an identity-related feature vector obtained for another image to determine whether or not a person corresponding to the search target is included in the other image.

10 Claims, 9 Drawing Sheets

(56) References Cited

U.S. PATENT DOCUMENTS

| | | | |
|---|---|---|---|
| 2003/0113002 A1* | 6/2003 | Philomin | G06K 9/00885 |
| | | | 382/116 |
| 2008/0240566 A1* | 10/2008 | Thint | G06K 9/627 |
| | | | 382/181 |
| 2013/0343642 A1* | 12/2013 | Kuo | G06K 9/4652 |
| | | | 382/159 |
| 2016/0070986 A1* | 3/2016 | Chidlovskii | G06K 9/6267 |
| | | | 382/104 |
| 2018/0114056 A1* | 4/2018 | Wang | G06K 9/00228 |
| 2018/0130324 A1* | 5/2018 | Yu | G06K 9/00295 |
| 2018/0173940 A1* | 6/2018 | Ye | G06K 9/00369 |
| 2018/0373962 A1* | 12/2018 | Ye | G06K 9/00369 |
| 2019/0295302 A1* | 9/2019 | Fu | G06T 7/0002 |
| 2019/0354859 A1* | 11/2019 | Xu | G06N 3/006 |
| 2020/0065563 A1* | 2/2020 | Zou | G06K 9/00288 |
| 2020/0175259 A1* | 6/2020 | Noh | G06T 7/11 |
| 2020/0226421 A1* | 7/2020 | Almazan | G06K 9/00771 |
| 2020/0242774 A1* | 7/2020 | Park | G06N 20/10 |
| 2020/0265219 A1* | 8/2020 | Liu | G06K 9/00288 |
| 2020/0272860 A1* | 8/2020 | Uchiyama | G06K 9/6271 |
| 2020/0342271 A1* | 10/2020 | Wang | G06K 9/6256 |
| 2021/0004589 A1* | 1/2021 | Turkelson | G06K 9/6273 |
| 2021/0064853 A1* | 3/2021 | Ham | G06K 9/6262 |
| 2021/0097691 A1* | 4/2021 | Liu | G06N 3/0454 |
| 2021/0232803 A1* | 7/2021 | Fu | G06K 9/00228 |

* cited by examiner

PERSON RE-IDENTIFICATION APPARATUS AND METHOD

CROSS-REFERENCE TO RELATED APPLICATIONS

This application claims priority under 35 U.S.C. § 119 to, and the benefit of, Korean Patent Application No. 10-2019-0104887, filed with the Korean Intellectual Property Office on Aug. 27, 2019, the disclosure of which is incorporated herein by reference in its entirety.

BACKGROUND

1. Technical Field

The present disclosure relates to a person re-identification apparatus and method, more particularly to an apparatus and a method for deep learning-based person re-identification using identity inversion.

2. Description of the Related Art

Previous person identification techniques could be performed based only on images that include features which allow easy identification, such as facial feature. As such, there was the limitation that re-identification was difficult when images were taken in various different environments, with changes in posture, background, distance, and angle, even if the images were of the same person.

Thus, in recent times, there has been active research on person re-identification (also referred to as 'reID') technology, which relates to finding the same person in images taken in different environments. Person re-identification technology can be used in various fields to search and track a particular person in multiple images, such as when looking for a missing person or looking for a criminal.

Person re-identification technology may entail extracting features that represent the identity of a person rather than a particular part, generally by using an artificial neural network, and identifying the same person based on the extracted features. That is, features which represent the identity of each individual and which are not limited to the facial form of a person or to a particular posture, background, angle, lighting condition, etc., may be extracted for re-identifying a person, so that the same person can be detected from multiple different images.

However, even when person re-identification technology employs an artificial neural network that has learned to extract features which represent the identity of a person, there are still difficulties in accurately finding a particular person in a robust manner under greatly varying environment conditions, and such learning may require providing various posture information, background information, etc.

SUMMARY

An aspect of the disclosure is to provide a person re-identification apparatus and method that can accurately find a particular person in a robust manner under varying environment conditions.

Another aspect of the disclosure is to provide a person re-identification apparatus and method that does not provide various labels for posture, background, and the like, but rather readily learns data that has only been labeled with identifiers for persons included in the images, to be able to accurately identify a person in a robust manner under varying environment conditions.

An embodiment of the disclosure, conceived to achieve the objectives above, provides a person re-identification apparatus that includes: an identity feature extraction part configured to receive a multiple number of images each including a person requiring re-identification, extract features related to an identity of a person included in each image according to a pattern estimation method learned beforehand, and obtain an identity-related feature vector for each image; and a re-identification determination part configured to analyze a degree of similarity between an identity-related feature vector obtained for a base image including a search target from among the plurality of images and an identity-related feature vector obtained for another image to determine whether or not a person corresponding to the search target is included in the other image.

The identity feature extraction part can perform learning by back-propagating a loss obtained from determining a difference between a shuffle image and a learning image, where the shuffle image may be generated by a concatenating, a reverse concatenating, and a synthesizing of identity-related feature vectors obtained from a multiple number of learning images labeled with identifiers of persons included in the learning images and a multiple number of identity-unrelated feature vectors obtained by extracting a feature unrelated to an identity of a person included in each image.

The identity feature extraction part can perform learning in a learning system for learning the identity feature extraction part, The learning system can include: a non-identity feature extraction part configured to receive a multiple number of learning images labeled with identifiers of the same person and extract a feature unrelated to an identity of a person included in a learning image to obtain an identity-unrelated feature vector; a feature inversion concatenation part configured to generate concatenation feature vectors by concatenating identity-related feature vectors and identity-unrelated feature vectors obtained from same learning images and inversely concatenating identity-related feature vectors and identity-unrelated feature vectors obtained from different learning images for the identity-related feature vectors and identity-unrelated feature vectors obtained for the multiple learning images; an image synthesis part configured to generate the shuffle image by receiving and synthesizing the concatenation feature vectors; a domain identification part configured to determine whether or not the shuffle image is a synthesized image; and an error backpropagation part configured to perform backpropagation with a loss occurring in the identity feature extraction part, the non-identity feature extraction part, and the image synthesis part calculated as the difference between the shuffle image and the learning image.

The feature inversion concatenation part can partition each of the identity-related feature vectors obtained from different learning images into predefined segment units, generate partial shuffle-related feature vectors by shuffling a multiple number of partitioned shuffle-related feature vectors, and concatenate the partial shuffle-related feature vectors and the identity-unrelated feature vectors to further generate partial shuffle-concatenation feature vectors.

The image synthesis part can synthesize the partial shuffle-concatenation feature vectors to generate a partial shuffle image.

The feature inversion concatenation part can obtain the partial shuffle-related feature vectors by selecting and exchanging partition-related feature vectors for a corresponding position from among a multiple number of partition-related feature vectors in a predefined or a random order, where the multiple number of partition-related feature vectors may be obtained by partitioning each of a multiple number of identity-related feature vectors.

The error backpropagation part can calculate the loss as a difference between the learning image from which the identity-unrelated feature vector is extracted and the shuffle image or the partial shuffle image.

An embodiment of the disclosure, conceived to achieve the objectives above, provides a person re-identification method that includes: a learning step of back-propagating a loss obtained from determining a difference between a shuffle image and a learning image, where the shuffle image may be generated by a concatenating, an inverse concatenating, and a synthesizing of identity-related feature vectors obtained from a multiple number of learning images labeled with identifiers of persons included in the learning images and a multiple number of identity-unrelated feature vectors obtained by extracting a feature unrelated to an identity of a person included in each image; and a re-identification step of receiving a multiple number of images each including a person requiring re-identification and determining whether or not the same person is included in the multiple images.

The re-identification step can include: obtaining an identity-related feature vector for each image by receiving the multiple images and extracting features related to an identity of a person included in each image according to a pattern estimation method learned in the learning step; and analyzing a degree of similarity between an identity-related feature vector obtained for a base image including a search target from among the multiple images and an identity-related feature vector obtained for another image to determine whether or not a person corresponding to the search target is included in the other image.

Thus, a person re-identification apparatus and method according to certain embodiments of the disclosure can provide learning that involves shuffling identity-related features, which represent the identity of a person included in images, and identity-unrelated features, which represent features other than identity, to generate a shuffle image and then learning to identify a person based on the shuffle image, so that a particular person may be found accurately and robustly under a variety of environment conditions. Moreover, since the learning may be performed simply using learning images labeled only with identifiers of the persons included the images, the learning can be readily performed without having to label supplementary information such as background, posture, and the like.

Additional aspects and advantages of the present disclosure will be set forth in part in the description which follows, and in part will be obvious from the description, or may be learned by practice of the disclosure.

DETAILED DESCRIPTION

Figure 1:
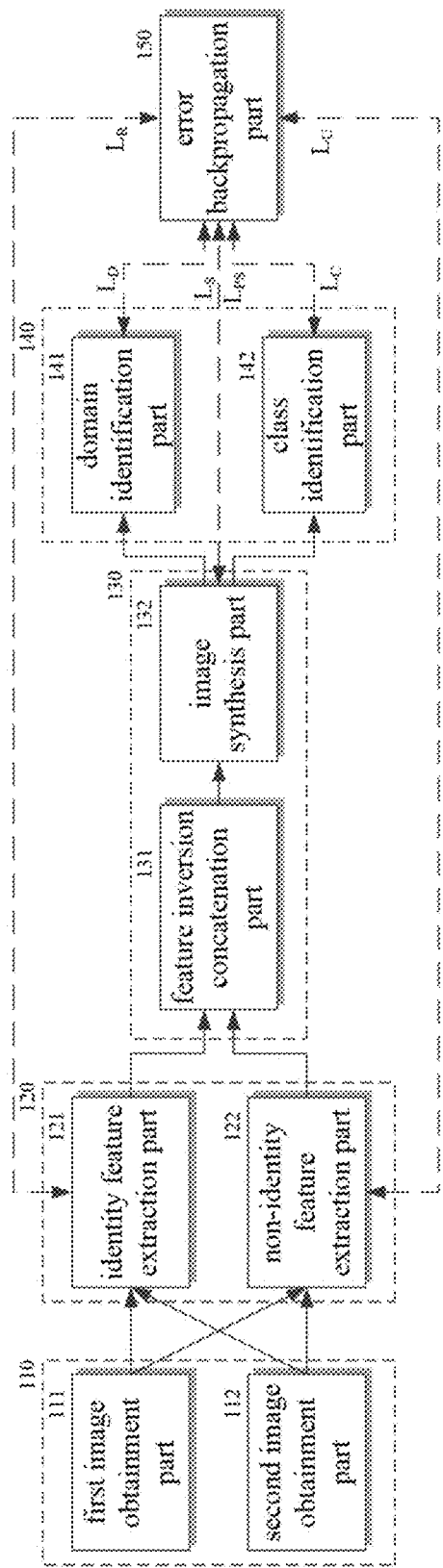
FIG. 1 schematically illustrates the structure of a learning system for learning a person re-identification apparatus according to an embodiment of the disclosure.

To sufficiently understand the present disclosure, its advantages, and the objectives achieved by practice of the disclosure, it is necessary to refer to the appended drawings which illustrate preferred embodiments of the disclosure as well as the descriptions provided for the appended drawings.

The present disclosure is described in detail below, through a description of preferred embodiments of the disclosure with reference to the accompanying drawings. However, the disclosure can be implemented in various different forms and is not limited to the described embodiments. For a clearer understanding of the invention, parts that are not of great relevance to the invention have been omitted, and like reference numerals in the drawings are used to represent like elements.

Throughout the specification, reference to a part "including", "having", or "comprising" an element does not preclude the existence of one or more other elements and can mean other elements are further included, unless there is specific mention to the contrary. Also, terms such as "part", "device", "module", "block", etc., refer to units for processing at least one function or operation, where such units can be implemented as hardware, software, or a combination of hardware and software.

Figure 2A:
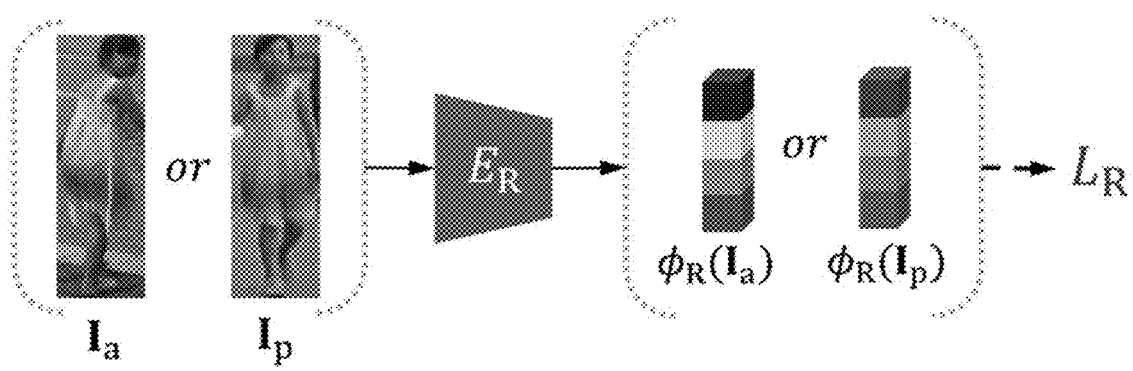
FIG. 2A and FIG. 2B illustrate operations for extracting identity-related feature vectors and identity-unrelated feature vectors in the learning system of FIG. 1.
Figure 2B:
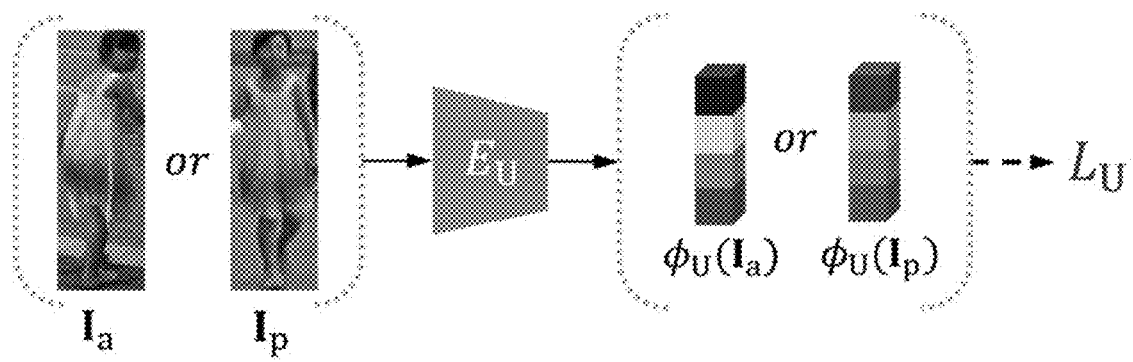

FIG. 1 schematically illustrates the structure of a learning system for learning a person re-identification apparatus according to an embodiment of the disclosure, FIGS. 2A and 2B illustrate operations for extracting identity-related feature vectors and identity-unrelated feature vectors in the learning system of FIG. 1, and FIGS. 3 to 6 illustrate operations for using identity-related feature vectors and identity-unrelated feature vectors to generate a synthesized image and re-identify a person in the learning system of FIG. 1.

Referring to FIG. 1, a learning system for providing learning to a person re-identification apparatus according to an embodiment of the disclosure may include an image obtainment part 110, a feature vector extraction part 120, a shuffle image generation part 130, an identification part 140, and an error backpropagation part 150.

The image obtainment part 110 may obtain multiple learning images in which the same person is included. The image obtainment part 110 can obtain the learning images from a database (not shown) storing multiple images or from an image capturing apparatus such as a camera, etc., or can receive the learning images by way of an external apparatus and a network.

The image obtainment part 110 can include a first image obtainment part 111 and a second image obtainment part 112. The first image obtainment part 111 and the second image obtainment part 112 can obtain different learning images of the same person, where the learning image obtained by the first image obtainment part 111 is referred to herein as an anchor image ($I_a$), and the second image obtainment part 112 may obtain at least one positive image ($I_p$), which is a learning image that includes the same person as the search target included in the anchor image ($I_a$).

The feature vector extraction part 120 may receive the anchor image ($I_a$) and positive image ($I_p$) obtained at the image obtainment part 110 and, from each of the received anchor image ($I_a$) and positive image ($I_p$), extract identity-related features vectors ($\phi_R(I_a)$, $\phi_R(I_p)$) which represent features related to the identity of a person and identity-unrelated features vectors ($\phi_U(I_a)$, $\phi_U(I_p)$) which represent features unrelated to the identity of a person.

The feature vector extraction part 120 can include an identity feature extraction part 121 and a non-identity feature extraction part 122. The identity feature extraction part 121 and the non-identity feature extraction part 122 can each be implemented as an artificial neural network that has learned a pattern estimation method. The identity feature extraction part 121 and the non-identity feature extraction part 122 may each receive an anchor image ($I_a$) and a positive image ($I_p$) and extract features from each of the anchor image ($I_a$) and positive image ($I_p$) according to the learned pattern estimation method, as illustrated in FIGS. 2A and 2B.

However, the identity feature extraction part 121 and the non-identity feature extraction part 122 may learn to estimate patterns different from each other, so that features different from each other may be extracted from the anchor image ($I_a$) and positive image ($I_p$). As illustrated in FIG. 2A, the identity feature extraction part 121 may extract features related to the identity of the person included in each of the anchor image ($I_a$) and the positive image ($I_p$) to obtain the identity-related feature vectors ($\phi_R(I_a)$, $\phi_R(I_p)$). Here, the features related to the identity of a person extracted by the identity feature extraction part 121 can include, for example, features associated with a facial shape, hairstyle, clothing, and gender.

Conversely, as illustrated in FIG. 2B, the non-identity feature extraction part 122 may extract features that are unrelated to the identity of the person included in each of the anchor image ($I_a$) and the positive image ($I_p$) to obtain the identity-unrelated feature vectors ($\phi_U(I_a)$, $\phi_U(I_p)$). The features unrelated to the identity of a person extracted by the non-identity feature extraction part 122 can be features associated with scale, posture, background, etc.

Here, the learning may be performed such that the identity-related feature vector ($\phi_R(I_a)$) and identity-unrelated feature vector ($\phi_U(I_a)$) extracted from the anchor image ($I_a$) include all of the features of the anchor image ($I_a$) and the identity-related feature vector ($\phi_R(I_p)$) and identity-unrelated feature vector ($\phi_U(I_p)$) extracted from the positive image ($I_p$) include all of the features of the positive image ($I_p$).

A reason for the feature vector extraction part 120 being equipped with the identity feature extraction part 121 and the non-identity feature extraction part 122 to obtain not only the identity-related feature vectors ($\phi_R(I_a)$, $\phi_R(I_p)$) but also the identity-unrelated feature vectors ($\phi_U(I_a)$, $\phi_U(I_p)$) is so that a generative adversarial network (GAN) may be used to enable robust learning of feature expressions for person re-identification.

A generative adversarial network (GAN) is associated with a technique in which two neural network models generate virtual synthesized images that are similar to a real subject, and each determines whether a generated synthesized image is a real image or a synthesized image, to iteratively perform learning in a competitive manner, whereby the synthesized images can be generated more elaborately and the ability to identify real images can be increased.

The learning system of this embodiment, based on a generative adversarial network (GAN) used for identifying real images and synthesized images, may apply learning such that the identity feature extraction part 121 learns to extract the identity-related feature vectors ($\phi_R(I_a)$, $\phi_R(I_p)$) from the received images, thereby allowing the person re-identification apparatus to accurately identify whether or not the persons included in different images are the same person.

The shuffle image generation part 130 may receive and concatenate the identity-related feature vectors ($\phi_R(I_a)$, $\phi_R(I_p)$) and the identity-unrelated feature vectors ($\phi_U(I_a)$, $\phi_U(I_p)$) to generate shuffle images, which are synthesized images. In particular, in order that the learning may be performed to enable an accurate re-identification of a person regardless of environment conditions such as background or posture, the shuffle image generation part 130 in this embodiment may generate the shuffle images with various combinations of the identity-related feature vectors ($\phi_R(I_a)$, $\phi_R(I_p)$) and identity-unrelated feature vectors ($\phi_U(I_a)$, $\phi_U(I_p)$) extracted from the anchor image ($I_a$) and positive image ($I_p$).

Here, the shuffle image generation part 130 can generate shuffle images by combining the identity-related feature vector ($\phi_R(I_a)$) and identity-unrelated feature vector ($\phi_U(I_a)$) of the anchor image ($I_a$) and the identity-related feature vector ($\phi_R(I_p)$) and identity-unrelated feature vector ($\phi_U(I_p)$) of the positive image ($I_p$). Furthermore, the shuffle images can be generated by inverting the identity-related feature vectors ($\phi_R(I_a)$, $\phi_R(I_p)$) and identity-unrelated feature vectors ($\phi_U(I_a)$, $\phi_U(I_p)$) of the anchor image ($I_a$) and positive image ($I_p$).

The shuffle image generation part 130 can include a feature inversion concatenation part 131, which may receive and concatenate the identity-related feature vectors ($\phi_R(I_a)$, $\phi_R(I_p)$) and identity-unrelated feature vectors ($\phi_U(I_a)$, $\phi_U(I_p)$) from the feature vector extraction part 120, and an image synthesis part 132, which may receive and synthesize the feature vectors concatenated at the feature inversion concatenation part 131 to generate the shuffle images.

The feature inversion concatenation part 131 may first generate concatenation feature vectors by concatenating the identity-related feature vectors ($\phi_R(I_a)$, $\phi_R(I_p)$) and identity-unrelated feature vectors ($\phi_U(I_a)$, $\phi_U(I_p)$) extracted from the same images ($I_a$, $I_p$). That is, as illustrated in FIG. 3, the identity-related feature vector ($\phi_R(I_a)$) and identity-unrelated feature vector ($\phi_U(I_a)$) extracted from the anchor image ($I_a$) may be received and concatenated to generate a synthesized image, and the identity-related feature vector ($\phi_R(I_p)$) and identity-unrelated feature vector ($\phi_U(I_p)$) extracted from the positive image ($I_p$) may be received and concatenated to generate a concatenation feature vector.

Figure 4:
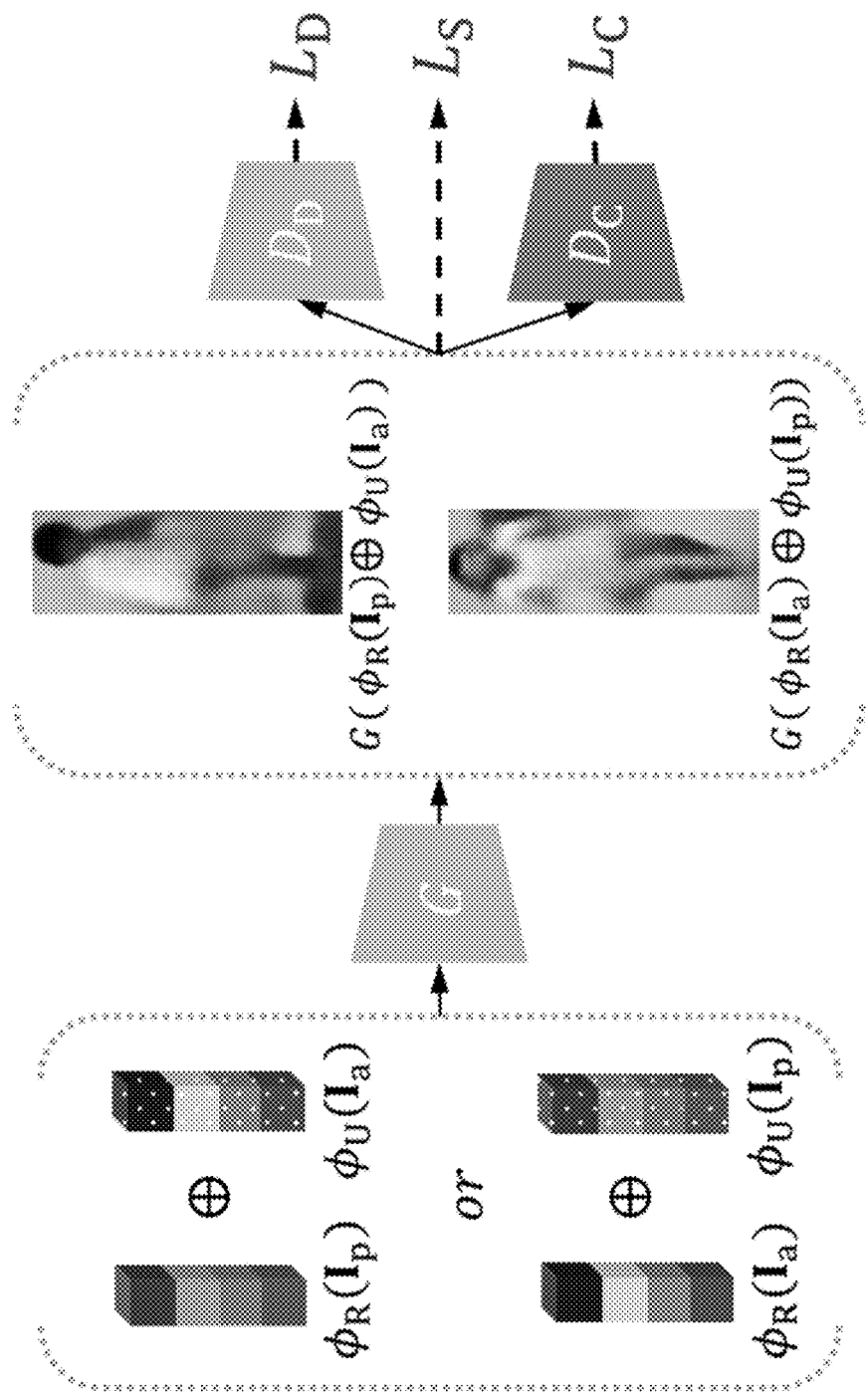

Also, in this embodiment, the feature inversion concatenation part 131 can generate a concatenation feature vector by concatenating the identity-related feature vector ($\phi_R(I_a)$) extracted from the anchor image ($I_a$) and the identity-unrelated feature vector ($\phi_U(I_p)$) extracted from the positive image ($I_p$), as illustrated in FIG. 4. Also, the feature inversion concatenation part 131 can generate a concatenation feature vector by concatenating the identity-unrelated feature vector ($\phi_U(I_a)$) extracted from the anchor image ($I_a$) and the identity-related feature vector ($\phi_R(I_p)$) extracted from the positive image ($I_p$).

In other words, the identity-related feature vectors ($\phi_R(I_a)$, $\phi_R(I_p)$) and identity-unrelated feature vectors ($\phi_U(I_a)$, $\phi_U(I_p)$) extracted from the anchor image ($I_a$) and the positive image ($I_p$) can be inversely concatenated.

Figure 3:
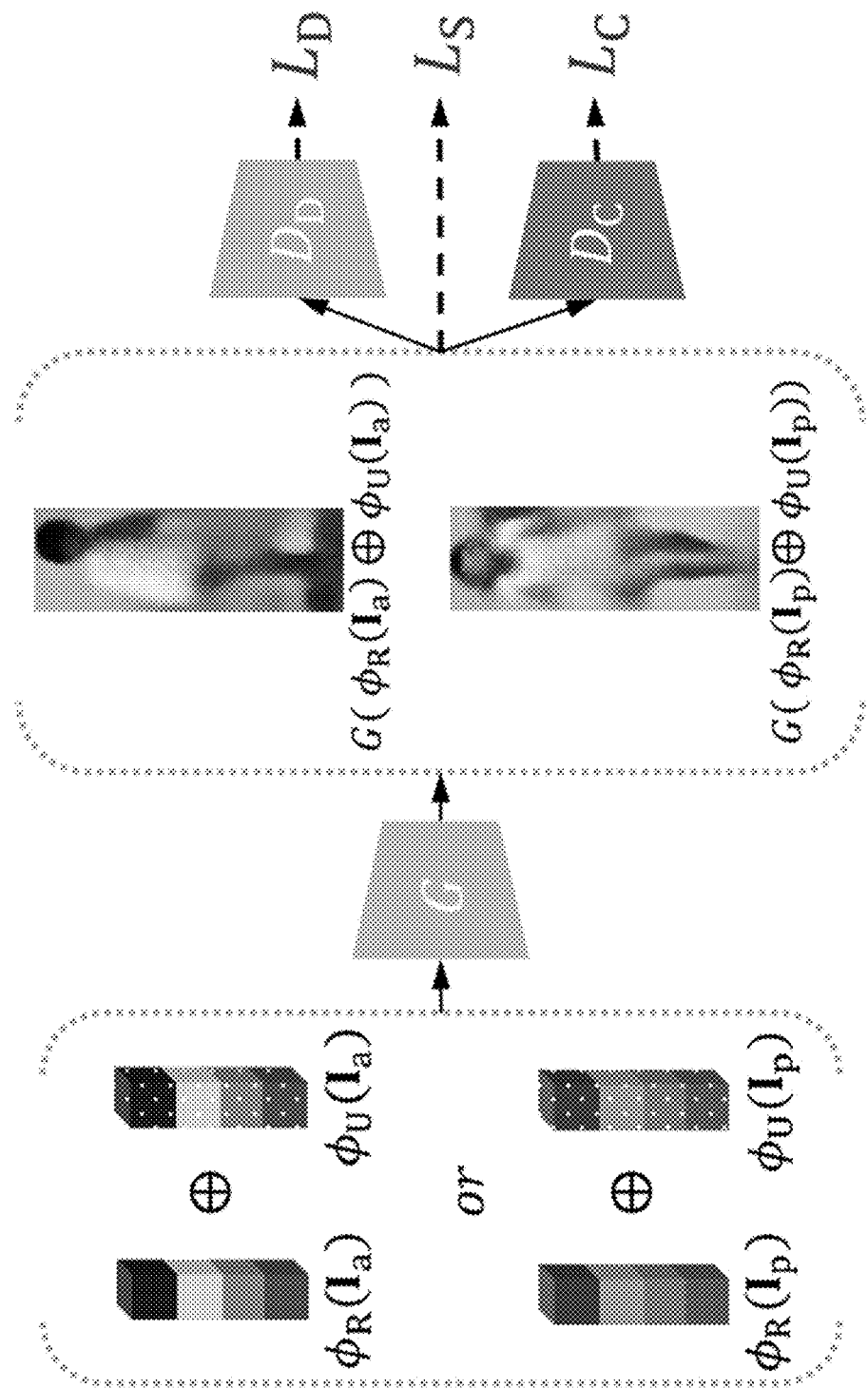
FIG. 3, FIG. 4, FIG. 5, and FIG. 6 illustrate operations for using identity-related feature vectors and identity-unrelated feature vectors to generate a synthesized image and re-identify a person in the learning system of FIG. 1.

In FIG. 3 and FIG. 4, $\oplus$ represents a concatenation operator for concatenating two feature vectors.

Figure 5:
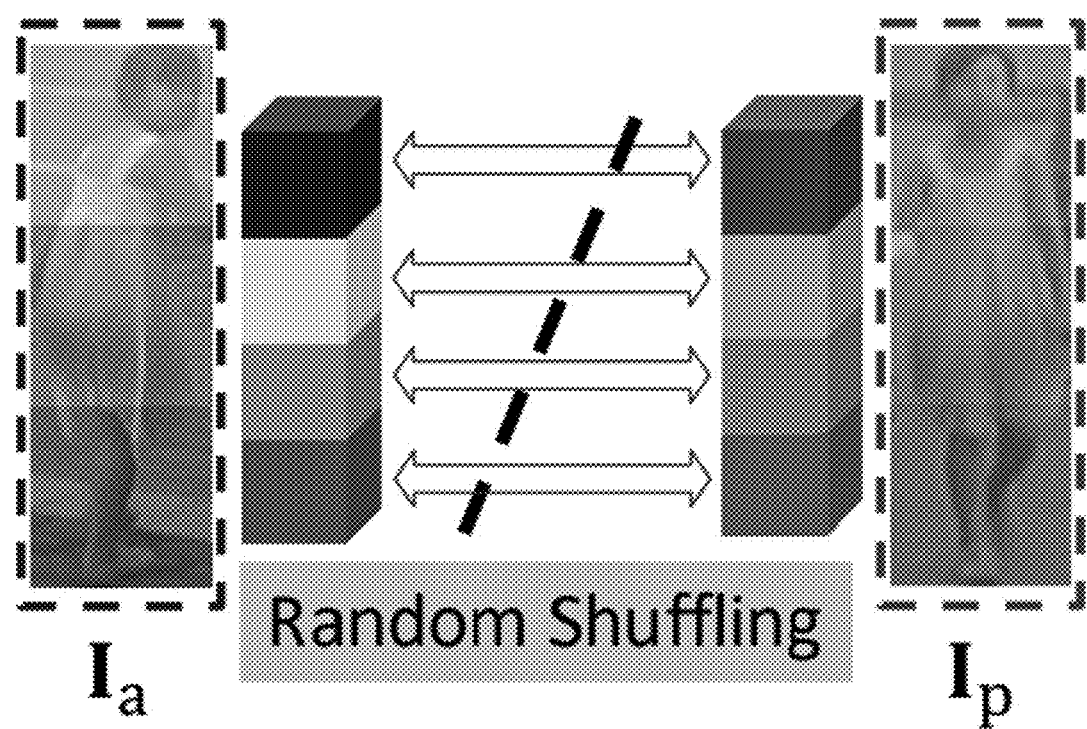
Figure 6:
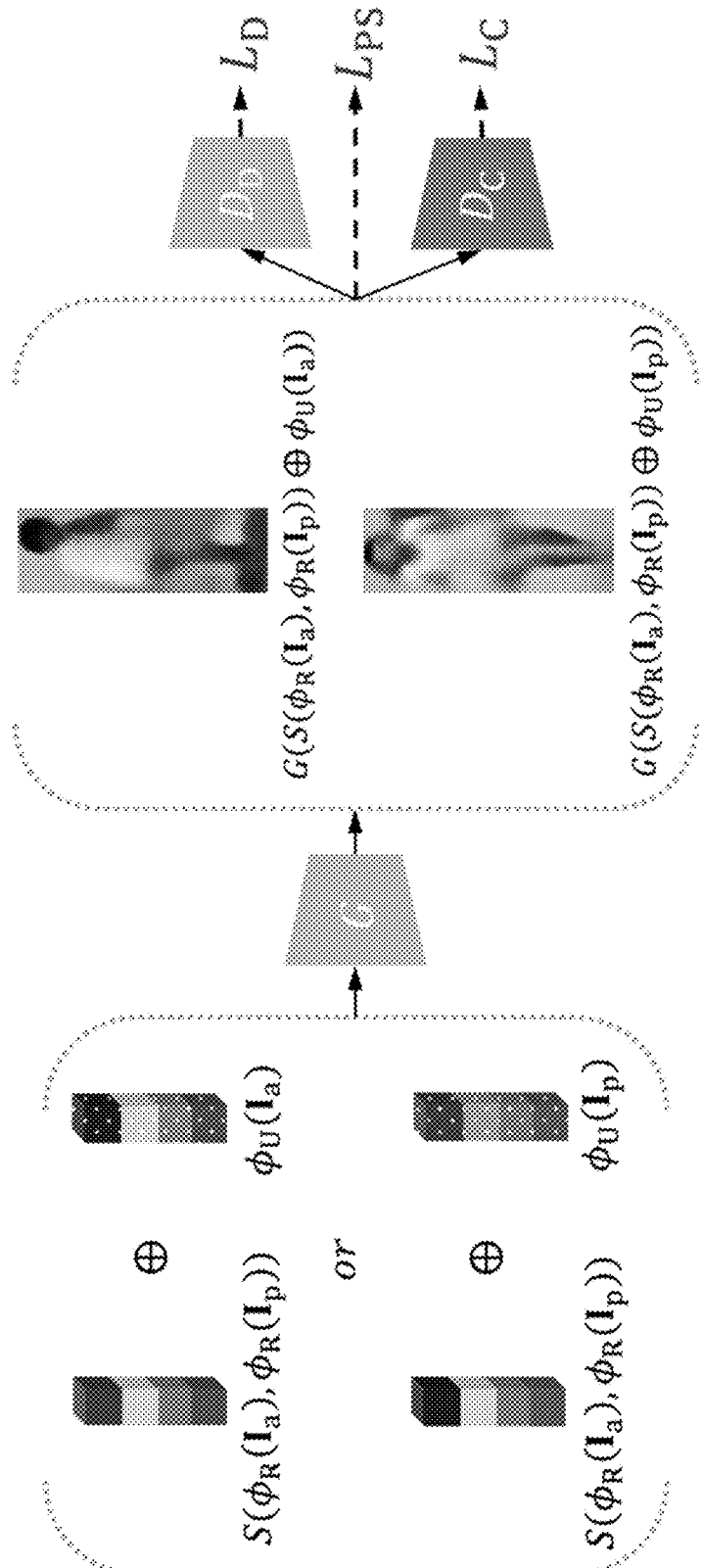

Furthermore, as illustrated in FIGS. 5 and 6, the feature inversion concatenation part 131 can generate partial shuffle-related feature vectors $(S(\phi^k_R(I_a), \phi^k_R(I_p)))$ by partitioning the identity-related feature vectors $\phi_R(I_a), \phi_R(I_p))$ extracted respectively from the anchor image $(I_a)$ and positive image $(I_p)$ into predefined size units and shuffling the multiple number of partition-related feature vectors $(\phi^k_R(I_a), \phi^k_R(I_p))$ thus partitioned. Here, the feature inversion concatenation part 131 can, for example, generate the partial shuffle-related feature vectors $(S(\phi_R(I_a), \phi_R(I_p)))$ by exchanging partition-related feature vectors which correspond to each other from among the multiple number of partitioned partition-related feature vectors $(\phi^k_R(I_a), \phi^k_R(I_p))$ in a predefined manner or randomly.

Then, the generated partial shuffle-related feature vectors $(S(\phi_R(I_a), \phi_R(I_p)))$ can be concatenated with the identity-unrelated feature vector $(\phi_U(I_a))$ extracted from the anchor image $(I_a)$ or the identity-unrelated feature vector $(\phi_U(I_p))$ extracted from the positive image $(I_p)$ to generate partial shuffle-concatenation feature vectors.

The image synthesis part 132 may receive the concatenation feature vectors, which have been formed as the identity-related feature vectors $(\phi_R(I_a), \phi_R(I_p))$ and identity-unrelated feature vectors $(\phi_U(I_a), \phi_U(I_p))$ are concatenated in various combinations at the feature inversion concatenation part 131, and may synthesize the concatenation feature vectors to generate shuffle images $(G(\phi_R(I_a) \oplus \phi_U(I_a)), G(\phi_R(I_p) \oplus \phi_U(I_p)), G(\phi_R(I_p) \oplus \phi_U(I_a)), G(\phi_R(I_a) \oplus \phi_U(I_p)))$, which are synthesized images.

Here, the image synthesis part 132 can be implemented as an artificial neural network at which learning is performed and can generate the shuffle images from the concatenation feature vectors according to a learned method.

Also, the image synthesis part 132 can receive and synthesize partial shuffle-concatenation feature vectors to generate partial shuffle images $(G(S(\phi_R(I_a), \phi_R(I_p)) \oplus \phi_U(I_a)), G(S(\phi_R(I_a), \phi_R(I_p)) \oplus \phi_U(I_p)))$.

A reason for the shuffle image generation part 130 generating shuffle images $(G(\phi_R(I_a) \oplus \phi_U(I_a)), G(\phi_R(I_p) \oplus \phi_U(I_p)))$ by synthesizing the identity-related feature vector $(\phi_R(I_a))$ and the identity-unrelated feature vector $\phi_U(I_a))$ extracted from the anchor image $(I_a)$ and synthesizing the identity-related feature vector $(\phi_R(I_p))$ and the identity-unrelated feature vector $(\phi_U(I_p))$ extracted from the positive image $(I_p)$ in this embodiment is to provide learning such that the identity-related feature vectors $(\phi_R(I_a), \phi_R(I_p))$ and the identity-unrelated feature vectors $(\phi_U(I_a), \phi_U(I_p))$ extracted from the same images can cover all of the identity-related features and identity-unrelated features of the images.

Also, a reason for the shuffle image generation part 130 generating shuffle images $(G(\phi_R(I_p) \oplus \phi_U(I_a)), G(\phi_R(I_a) \oplus \phi_U(I_p)))$ by synthesizing the identity-related feature vectors $(\phi_R(I_a), \phi_R(I_p))$ and identity-unrelated feature vectors $(\phi_U(I_a), \phi_U(I_p))$ extracted respectively from the anchor image $(I_a)$ and positive image $(I_p)$ with the order inverted in this embodiment is to obtain person expressions that are very robust against occlusion or great changes in posture, etc., and thus provide learning that allows an accurate determination of whether or not the persons included in the anchor image $(I_a)$ and positive images $(I_p)$ obtained for various environments are the same person.

Also, a reason for the shuffle image generation part 130 generating not only the shuffle images $(G(\phi_R(I_a) \oplus \phi_U(I_a)), G(\phi_R(I_p) \oplus \phi_U(I_p)), G(\phi_R(I_p) \oplus \phi_U(I_a)), G(\phi_R(I_a) \oplus \phi_U(I_p)))$ but also partial shuffle images $(G(S(\phi_R(I_a), \phi_R(I_p)) \oplus \phi_U(I_a)), G(S(\phi_R(I_a), \phi_R(I_p)) \oplus \phi_U(I_p)))$ by using shuffle-concatenation feature vectors, which are formed by shuffling the partition-related feature vectors $(\phi^k_R(I_a), \phi^k_R(I_p))$ partitioned from the identity-related feature vectors $(\phi_R(I_a), \phi_R(I_p))$, is so that the re-identification of a person can be achieved in a more robust manner by allowing an accurate determination of whether or not the persons included in the anchor image $(I_a)$ and positive image $(I_p)$ are the same person from not only the global features but also the local features of the anchor image $(I_a)$ and the positive image $(I_p)$.

When the shuffle images $(G(\phi_R(I_a) \oplus \phi_U(I_a)), G(\phi_R(I_p) \oplus \phi_U(I_p)), G(\phi_R(I_p) \oplus \phi_U(I_a)), G(\phi_R(I_a) \oplus \phi_U(I_p)))$ or partial shuffle images $(G(S(\phi_R(I_a), \phi_R(I_p)) \oplus \phi_U(I_a)), G(S(\phi_R(I_a), \phi_R(I_p)) \oplus \phi_U(I_p)))$ are generated at the shuffle image generation part 130, the identification part 140 may analyze the patterns of the shuffle images or partial shuffle images to determine which of the persons specified in the learning database the person included in the shuffle images corresponds to. That is, the classes of the shuffle images or partial shuffle images may be determined.

The identification part 140 can include a domain identification part 141, which may determine whether the shuffle images or partial shuffle images generated at the shuffle image generation part 130 are real images or virtually generated synthetic images, and a class identification part 142, which may determine the classes of the shuffle images or partial shuffle images to identify the class, i.e. the identifier, of the person included in the positive image $(I_p)$. Here, the domain identification part 141 and the class identification part 142 can be implemented as artificial neural networks that have each learned a respective pattern estimation method.

The domain identification part 141 may estimate the patterns of the shuffle images or partial shuffle images according to the learned pattern estimation method to determine whether the shuffle images or partial shuffle images are synthetic images or not. The domain identification part 141 may, together with the image synthesis part 132 for generating synthesized images, perform complementary learning in a generative adversarial network (GAN). In particular, in a person re-identification apparatus according to this embodiment, since the image synthesis part 132 may generate shuffle images or partial shuffle images, which are synthesized images, by using concatenated images that have been concatenated by the feature inversion concatenation part 131 from the identity-related feature vectors $(\phi_R(I_a), \phi_R(I_p))$ and identity-unrelated feature vectors $(\phi_U(I_a), \phi_U(I_p))$ extracted from the anchor image $(I_a)$ and positive image $(I_p)$ after they have been shuffled, the shuffle images or partial shuffle images can be regarded as having been generated by shuffling the identity of the person included in the anchor image $(I_a)$ and positive image $(I_p)$.

The technique of generating the shuffle images or partial shuffle images, which are synthesized images, by shuffling the identity of the person included in the anchor image $(I_a)$ and positive image $(I_p)$ in this manner is referred to herein as an identity shuffle generative adversarial network (IS-GAN). That is, a person re-identification apparatus according to this embodiment may learn to re-identify a person by using an identity shuffle generative adversarial network (IS-GAN).

The class identification part 142 may estimate the patterns of the shuffle images according to the learned pattern estimation method and determine the classes of the shuffle images. Here, the classes refer to identifiers $(y=\{1, 2, \ldots, C\})$ applied to different persons. That is, the class identification part 142 may determine the identifier label of each person included in the shuffle images or partial shuffle images. In other words, the persons included in the anchor image ($I_a$) or positive image ($I_p$) may be re-identified.

The error backpropagation part 150 may calculate the loss of the identity feature extraction part 121, non-identity feature extraction part 122, image synthesis part 132, domain identification part 141, and class identification part 142, which may be formed as artificial neural networks, and may back-propagate the calculated loss to provide learning for the person re-identification apparatus.

The error backpropagation part 150 may calculate the loss of the identity feature extraction part 121 (L($E_R$)=$L_R$) and the loss of the non-identity feature extraction part 122 (L($E_U$)=$L_U$), the loss of the image synthesis part 132 (L(G)=$L_S$+$L_{PS}$), the loss of the domain identification part 141 (L($D_D$)=$L_D$), and the loss of the class identification part 142 (L($D_C$)=$L_C$), and can then apply weights ($\lambda_R$, $\lambda_U$, $\lambda_S$, $\lambda_{PS}$, $\lambda_D$, $\lambda_C$) defined beforehand in correspondence with the calculated losses (L($E_R$), L($E_U$), L(G), L($D_D$), L($D_C$)) to calculate the total loss (L($E_R$, $E_U$, G, $D_D$, $D_C$)) as a weighted sum according to Equation 1.

$$\mathcal{L}_{(E_R,E_U,G,D_D,D_C)} = \lambda_R \mathcal{L}_R + \lambda_U \mathcal{L}_U + \lambda_S \mathcal{L}_S + \lambda_{PS} \mathcal{L}_{PS} + \lambda_D \mathcal{L}_D + \lambda_C \mathcal{L}_C \quad \text{[Equation 1]}$$

Here, the loss of the image synthesis part 132 (L(G)) is differentiated into a loss for the shuffle images ($L_S$) and a loss for the partial shuffle images ($L_{PS}$) to be expressed as two losses.

As described above, a person re-identification apparatus according to this embodiment may perform learning after receiving learning images that include the same person. Here, the learning images may be images labeled with identifiers (y={1, 2, . . . , C}) for the persons included in the images. That is, learning images including the same person would be labeled with the same identifier, and learning images including different persons would be labeled with different identifiers.

The error backpropagation part 150 can first obtain the loss of the identity feature extraction part 121 ($L_R$) according to Equation 2.

$$\mathcal{L}_R = -\sum_{c=1}^{C} \sum_{k=1}^{K} q_c^k \log p(c \mid w_c^k \phi_R^k(I^k)) \quad \text{[Equation 2]}$$

Here, p( ) represents a probability function, $I^k$ represents a partitioned image formed as a learning image (I) is partitioned according to predefined segments, $\phi_R^k(I^k)$ represents a partition-related feature vector extracted from the partitioned image ($I^k$), and $\phi_R(I) = \phi_R^1(I_L) \oplus \ldots \oplus \phi_R^K(I^K)$.

Also, $w_c^k$ is a weight for the identifier with which the learning image is labeled and the partitioned segment. Also, $q_c^k$ is an index representing whether or not the identifier (c) corresponds to an identity of the partitioned image ($I^k$), where, if the identifier (c) corresponds to an identity of the partitioned image ($I^k$) (for example, c=y), then $q_c^k$=1, and if it does not correspond to an identity, then $q_c^k$=0.

In Equation 2, the probability p(c|$w_c^k \phi_R^k(I^k)$) of the partitioned image ($I^k$) having the identifier (c) can be defined by using a softmax function as Equation 3.

$$p(c \mid w_c^k \phi_R^k(I^k)) = \frac{\exp(w_c^k \phi_R^k(I^k))}{\sum_{i=1}^{C} \exp(w_i^k \phi_R^k(I^k))} \quad \text{[Equation 3]}$$

Also, the error backpropagation part 150 can cause the features unrelated to identity extracted at the non-identity feature extraction part 122 to follow a normal distribution (N(0,1)) having zero mean and unit variance, so that the loss of the non-identity feature extraction part 122 ($L_U$) may be obtained by using the KL divergence (Kullback-Leibler divergence) loss according to Equation 4.

$$\mathcal{L}_U = \sum_{k=1}^{K} D_{KL}(\phi_U^k(I^k) \| \mathcal{N}(0,1)) \quad \text{[Equation 4]}$$

Here, $D_{KL}$ represents a KL divergence function for calculating the information entropy difference of two probability distributions, where $$D_{KL}(p \| q) = -\int p(z) \log \frac{p(z)}{q(z)},$$

and $\phi_U^k(I^k)$ represents a partition-unrelated feature vector extracted from a partitioned image ($I^k$). Since the KL divergence loss limits the distribution range to normalize the features that are unrelated to identity, there is not much identity-related information included. This allows the shuffle image generation part 130 to use identity-related features, when synthesizing images for a new person, so that the synthesis process may be easier.

The error backpropagation part 150 can calculate the loss of the shuffle image generation part 130 for the shuffle images ($L_S$) and for the partial shuffle images ($L_{PS}$) respectively according to Equation 5 and Equation 6.

$$\mathcal{L}_S = \sum_{i,j \in \{a,p\}} \| I_i - G(\phi_R(I_j) \oplus \phi_U(I_i)) \|_1 \quad \text{[Equation 5]}$$

$$\mathcal{L}_{PS} = \sum_{\substack{i,j \in \{a,p\} \\ i \neq j}} \| I_i - G(S(\phi_R(I_i), \phi_R(I_j)) \oplus \phi_U(I_i)) \|_1 \quad \text{[Equation 6]}$$

Here, $\| \ \|_1$ is a L1-norm function.

According to Equation 5 and Equation 6, the error backpropagation part 150 may calculate the loss for the shuffle images ($L_S$) and the loss for the partial shuffle images ($L_{PS}$) by accumulating the differences between the two learning images ($I_a$, $I_p$) and the shuffle images (G($\phi_R(I_a) \oplus \phi_U(I_a)$), G($\phi_R(I_p) \oplus \phi_U(I_p)$), G($\phi_R(I_p) \oplus \phi_U(I_a)$), G($\phi_R(I_a) \oplus \phi_U(I_p)$)) or partial shuffle images (G(S($\phi_R(I_a)$, $\phi_R(I_p)$)$\oplus \phi_U(I_a)$), G(S($\phi_R(I_a)$, $\phi_R(I_p)$)$\oplus \phi_U(I_p)$)) obtained as combinations of features extracted from the two learning images ($I_a$, $I_p$).

Here, as shown in Equation 5 and Equation 6, the error backpropagation part 150 may calculate the loss for the shuffle images ($L_S$) as the difference between the shuffle images (G($\phi_R(I_a) \oplus \phi_U(I_a)$), G($\phi_R(I_p) \oplus \phi_U(I_p)$)) that were synthesized using concatenation feature vectors formed by concatenating identity-related feature vectors and identity-unrelated feature vectors extracted from the same image, from among the shuffle images (G($\phi_R(I_a) \oplus \phi_U(I_a)$), G($\phi_R(I_p) \oplus \phi_U(I_p)$), G($\phi_R(I_p) \oplus \phi_U(I_a)$), G($\phi_R(I_a) \oplus \phi_U(I_p)$)) generated at the shuffle image generation part 130, and the original images ($I_a$, $I_p$).

Also, the difference between the shuffle images (G($\phi_R(I_p) \oplus \phi_U(I_a)$), G($\phi_R(I_a) \oplus \phi_U(I_p)$)) synthesized using feature vectors formed by inverting the identity-related feature vectors and identity-unrelated feature vectors and the images from which the unrelated feature vectors are derived may be calculated as the loss for the shuffle images ($L_S$).

The loss for the partial shuffle images ($L_{PS}$) may be calculated as the difference between the partial shuffle images ($G(S(\phi_R(I_a), \phi_R(I_p))\oplus\phi_U(I_a))$, $G(S(\phi_R(I_a), \phi_R(I_p))\oplus\phi_U(I_p))$) and the images from which the unrelated feature vectors concatenated with the partial shuffle-concatenation feature vectors are derived.

Also, the error backpropagation part 150 can obtain the loss of the domain identification part 141 ($L_D$) and the loss of the class identification part 142 ($L_C$) according to Equation 7 and Equation 8, respectively.

$$\mathcal{L}_D = \max_{D_D} \sum_{i\in\{a,p\}} \log D_D(I_i) + \qquad \text{[Equation 7]}$$
$$\sum_{i,j\in\{a,p\}} \log(1 - D_D(G(\phi_R(I_j)\oplus\phi_U(I_i)))) +$$
$$\sum_{\substack{i,j\in\{a,p\}\\i\neq j}} \log(1 - D_D(G(S(\phi_R(I_i), \phi_R(I_j))\oplus\phi_U(I_i)))).$$

$$\mathcal{L}_C = \qquad \text{[Equation 8]}$$
$$-\sum_{i\in\{a,p\}} \log D_C(I_i) - \sum_{i,j\in\{a,p\}} \log(D_C(G(\phi_R(I_j)\oplus\phi_U(I_i)))) -$$
$$\sum_{\substack{i,j\in\{a,p\}\\i\neq j}} \log(D_C(G(S(\phi_R(I_i), \phi_R(I_j))\oplus\phi_U(I_i)))).$$

In Equation 7, $D_D(\ )$ is a function representing the result of the domain identification part 141 determining the domain for the received image, and in Equation 8, $D_C(\ )$ is a function representing the result of the class identification part 142 determining the class (identifier) for the received image.

Consequently, the error backpropagation part 150 can calculate the losses ($L_R$, $L_U$, $L_S$, $L_{PS}$, $L_D$, $L_C$) at each component of the person re-identification apparatus according to Equations 2 to 8, and the calculated losses can be substituted into Equation 1 to obtain the total loss ($L(E_R, E_U, G, D_D, D_C)$).

The person re-identification apparatus can be provided with learning by performing backpropagation iteratively until the obtained total loss does not exceed a predefined threshold loss. In certain cases, it is possible to provide learning for the person re-identification apparatus by back-propagating the loss by a predefined number of iterations.

The learning system for a person re-identification apparatus illustrated in FIG. 1 may be a composition for performing learning by using an identity shuffle generative adversarial network (IS-GAN) technique, and the calculating of the total loss ($L(E_R, E_U, G, D_D, D_C)$) of Equation 1 by the error backpropagation part 150 is to provide learning for the entire learning system illustrated in FIG. 1.

However, a person re-identification apparatus according to an embodiment of the disclosure may extract and use only the identity feature extraction part 121 from the learning system of FIG. 1. Therefore, it is possible to provide learning only for the identity feature extraction part 121, non-identity feature extraction part 122, and image synthesis part 132, in which case the learning can involve the loss for the shuffle images ($L_S$) and the loss for the partial shuffle images ($L_{PS}$) expressed by Equations 5 and 6 instead of the total loss ($L(E_R, E_U, G, D_D, D_C)$).

In other words, in this embodiment, the error backpropagation part 150 can back-propagate the loss for the shuffle images ($L_S$) and the loss for the partial shuffle images ($L_{PS}$) to provide learning for the identity feature extraction part 121, non-identity feature extraction part 122, and image synthesis part 132.

Figure 7:
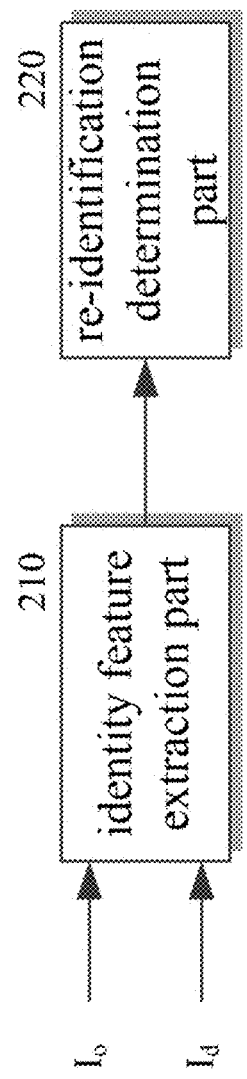
FIG. 7 schematically illustrates the structure of a person re-identification apparatus according to an embodiment of the disclosure.

FIG. 7 schematically illustrates the structure of a person re-identification apparatus according to an embodiment of the disclosure.

Referring to FIG. 7, a person re-identification apparatus according to this embodiment may include an identity feature extraction part 210 and a re-identification determination part 220. Here, the identity feature extraction part 210 may correspond to the identity feature extraction part 121 that has already undergone learning in the learning system illustrated in FIG. 1 and may receive an original image ($I_o$), which includes a person corresponding to the search target, and a re-identification image ($I_d$), which requires determining whether or not the same person as the person in the original image ($I_o$) is included, and then extract identity feature vectors from both the original image ($I_o$) and the re-identification image ($I_d$).

In certain cases, the identity feature extraction part 210 may extract the identity feature vector for the original image ($I_o$) beforehand and store the identity feature vector in the re-identification determination part 220. This is because person re-identification technology generally involves searching through a multiple number of re-identification images ($I_d$) to find which of the re-identification images ($I_d$) includes the person included in a particular original image ($I_o$).

The re-identification determination part 220 may calculate the degree of similarity between the identity feature vectors extracted at the identity feature extraction part 121 and may determine that the same person as the person in the original image ($I_o$) is included in the re-identification image ($I_d$) if the calculated degree of similarity is greater than or equal to a predefined threshold value. Conversely, if the calculated degree of similarity is smaller than the predefined threshold value, it may determine that the person included in the original image ($I_o$) is not included in the re-identification image ($I_d$). Thus, the person included in the original image ($I_o$) can be re-identified in the re-identification image ($I_d$).

Here, the re-identification determination part 220 can obtain the difference between the identity feature vectors by using, for instance, a cosine similarity.

Figure 8:
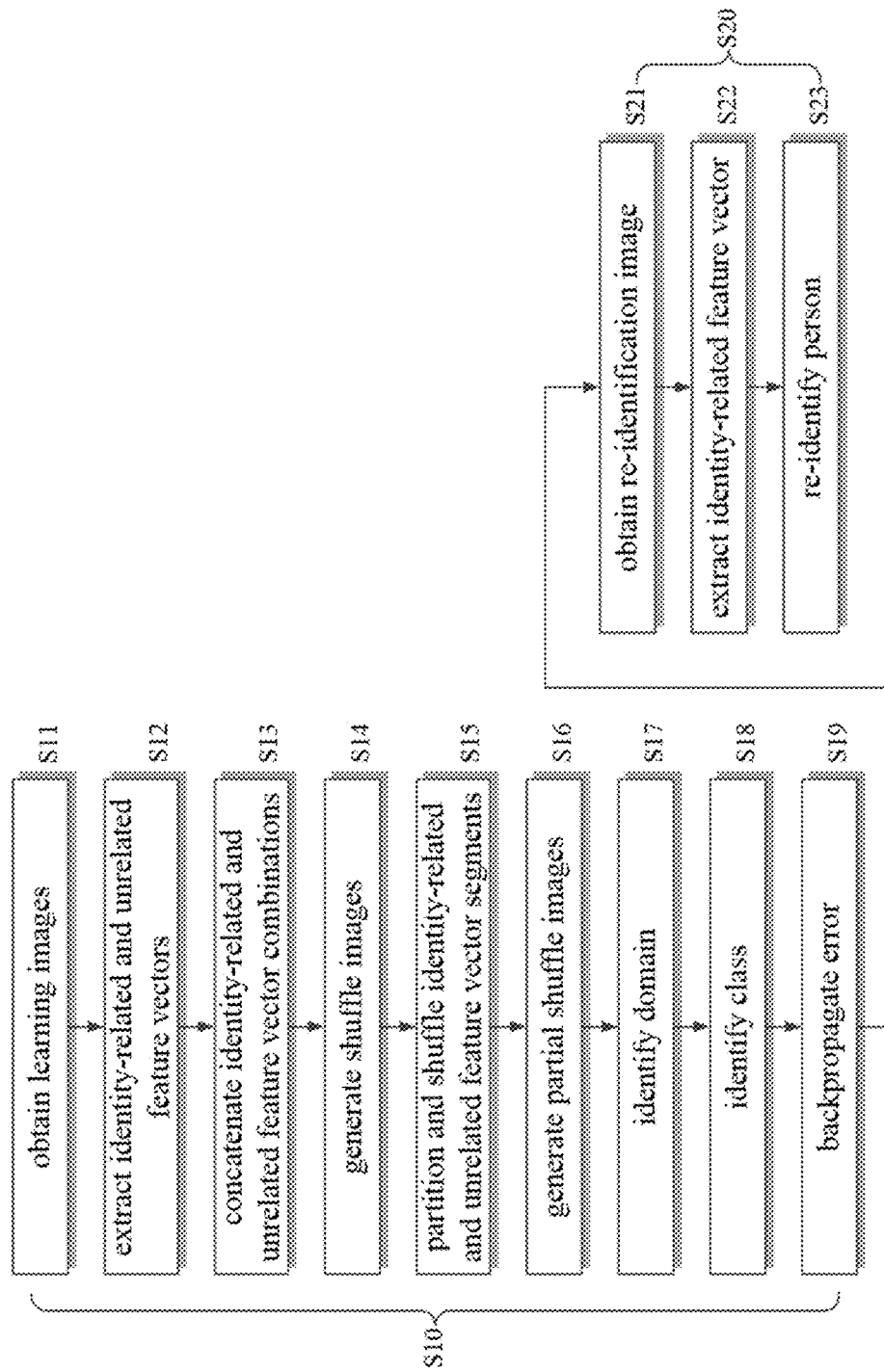
FIG. 8 illustrates a person re-identification method according to an embodiment of the disclosure.

FIG. 8 illustrates a person re-identification method according to an embodiment of the disclosure.

Referring to FIGS. 1 to 7, a person re-identification method according to this embodiment can be divided largely into a learning step (S10), in which the learning for person re-identification is provided, and a person re-identification step (S20), in which the person included in an image is identified according to the learned method.

In the learning step (S10), learning images may first be obtained (S11), where the learning images may be images that include persons and are labeled with identifiers ($y=\{1, 2, \ldots, C\}$) for the persons included in the images. Here, from among the multiple number of learning images labeled with identifiers for multiple persons, at least a pair of learning images ($I_a$, $I_p$) labeled with the same identifier, i.e. labeled as including the same person, can be extracted and obtained.

Then, from each of the at least one pair of obtained learning images, an identity-related feature vector ($\phi_R(I_a)$, $\phi_R(I_p)$), which represents features related to the identity of the person included in the learning images, and an identity-unrelated feature vector ($\phi_U(I_a)$, $\phi_U(I_p)$), which represents features unrelated to the identity of the person, may be extracted (S12).

Once the identity-related feature vectors ($\phi_R(I_a)$, $\phi_R(I_p)$) and identity-unrelated feature vectors ($\phi_U(I_a)$, $\phi_U(I_p)$) are extracted, the identity-related feature vectors ($\phi_R(I_a)$, $\phi_R(I_p)$) and identity-unrelated feature vectors ($\phi_R(I_a)$, $\phi_U(I_p)$) extracted respectively from the pair of learning images ($I_a$, $I_p$) may be concatenated in various combinations to generate concatenation feature vectors (S13).

Here, it is possible to not only concatenate the identity-related feature vectors ($\phi_R(I_a)$, $\phi_R(I_p)$) and identity-unrelated feature vectors ($\phi_U(I_a)$, $\phi_U(I_p)$) extracted from the same learning image ($I_a$, $I_p$) but also to invert and concatenate the identity-related feature vectors ($\phi_R(I_a)$, $\phi_R(I_p)$) and identity-unrelated feature vectors ($\phi_U(I_a)$, $\phi_U(I_p)$) extracted from different learning images ($I_a$, $I_p$).

When the concatenation feature vectors have been generated, the concatenation feature vectors may be synthesized to generate shuffle images (S14).

In certain cases, it is possible to also generate partial shuffle-related feature vectors ($S(\phi_R(I_a)$, $\phi_R(I_p))$) (S15) by partitioning the extracted identity-related feature vectors ($\phi_R(I_a)$, $\phi_R(I_p)$) and identity-unrelated feature vectors ($\phi_U(I_a)$, $\phi_U(I_p)$) into segments and shuffling segments that correspond to each other from among the partitioned segments.

The partial shuffle-related feature vectors ($S(\phi_R(I_a)$, $\phi_R(I_p))$) may be concatenated with the identity-unrelated feature vectors ($\phi_U(I_a)$, $\phi_U(I_a)$) to generate partial shuffle-concatenation feature vectors, and the generated partial shuffle-concatenation feature vectors may be synthesized according to a method learned beforehand to generate partial shuffle images (S16).

Once the shuffle images or partial shuffle images have been generated, the domain may be identified (S17), which represents whether the generated shuffle images or partial shuffle images are synthesized images or real images.

Also, the classes may be identified (S18), which represents the identifiers for the shuffle images or partial shuffle images.

Also, the losses ($L_S$, $L_{PS}$) occurring during the extracting of the identity-related feature vectors ($\phi_R(I_a)$, $\phi_R(I_p)$) and identity-unrelated feature vectors ($\phi_U(I_a)$, $\phi_U(I_p)$) and the generating of the shuffle images or partial shuffle images may be obtained, and the obtained losses ($L_S$, $L_{PS}$) may be back-propagated to perform learning.

Here, the learning step can be performed iteratively (S19) until the loss does not exceed a predefined threshold loss or until the number of iterations reaches a predefined number.

When the learning is completed, then in the person re-identification step (S20), an original image ($I_o$), which includes the person corresponding to the search target and a re-identification image ($I_d$), which includes a person requiring re-identification, may be obtained (S21). Here, the image having a person requiring re-identification refers to an image that requires a determining of whether or not the person corresponding to the search target is included.

When the re-identification image ($I_d$) is obtained, then an identity-related feature vector may be extracted from the re-identification image (S22) according to a pattern estimation method learned beforehand. Also, the degree of similarity between the extracted identity-related feature vector of the original image ($I_o$) and the identity-related feature vector of the re-identification image ($I_d$) may be analyzed to determine whether or not the same person as the person included in the original image ($I_o$) is also included in the re-identification image ($I_d$). That is, the person may be re-identified (S23).

Figure 9:
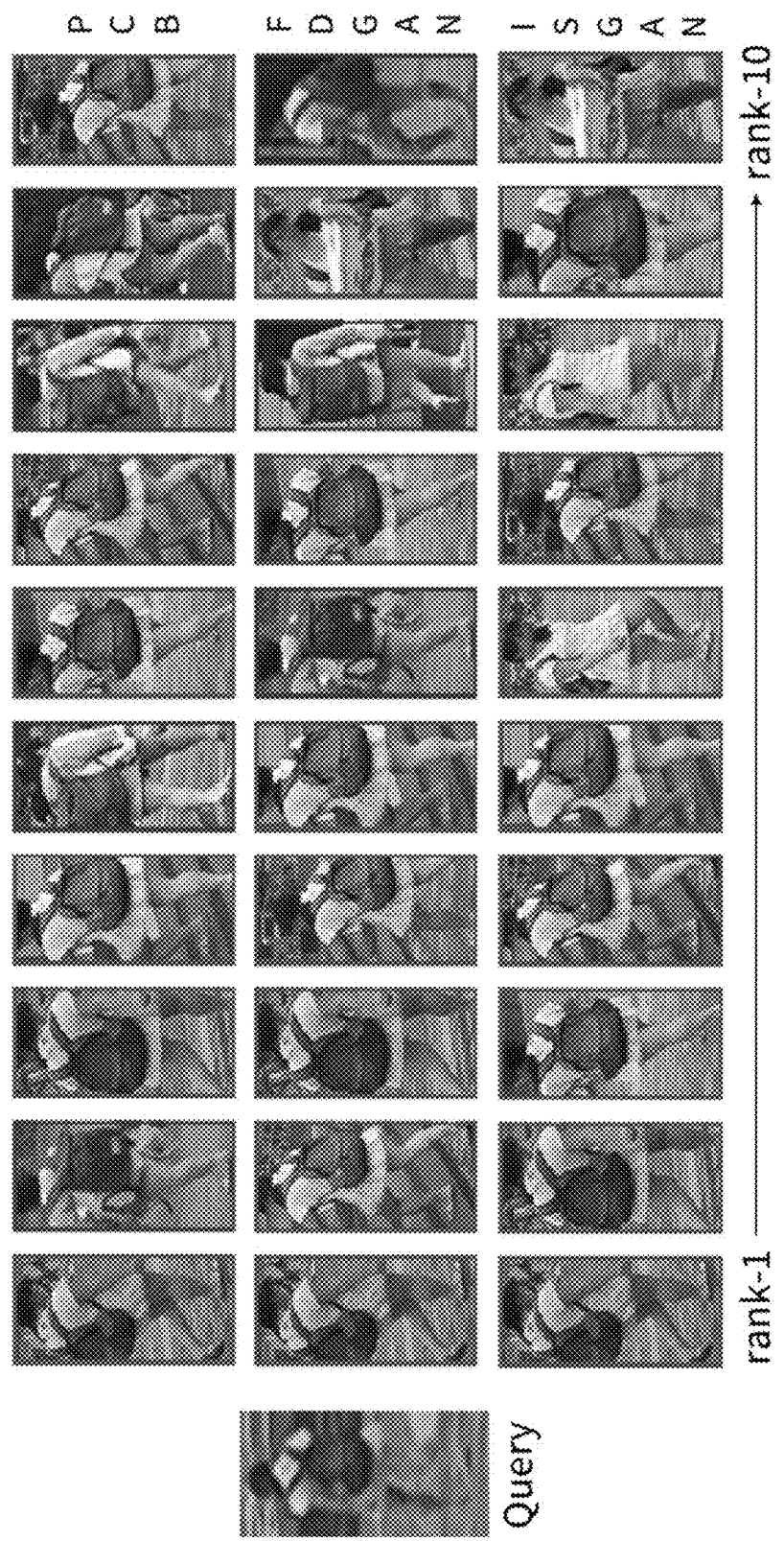
FIG. 9 illustrates the results of re-identifying a person with a person re-identification apparatus and method according to an embodiment of the disclosure.

FIG. 9 illustrates the results of re-identifying a person with a person re-identification apparatus and method according to an embodiment of the disclosure.

To verify the performance of a person re-identification apparatus and method using an identity shuffle generative adversarial network (IS-GAN) according to this embodiment, FIG. 9 also illustrates the results of person re-identification using existing techniques, namely the part-based convolutional baseline (PCB) technique and the feature distilling GAN (FD-GAN) technique.

FIG. 9 shows person re-identification results for a Market-1501 data set, where images marked in green represent cases determined as including the same person as the person included in the queried anchor image according to the respective techniques, and images marked in red represent cases determined as including a different person from the person included in the queried anchor image according to the respective techniques.

Referring to FIG. 9, according to the person re-identification results for the Market-1501 data set, the PCB technique focuses mainly on color in re-identifying persons and thus concentrates on the red backpack, leading to incorrect determinations, while the FD-GAN technique offers the advantage of not requiring information on posture but is subject to incorrect determinations of stating that even persons of different genders are similar. However, with the identity shuffle generative adversarial network (IS-GAN) technique according to this embodiment, the same person can be detected accurately in a robust manner with respect to posture, background, etc.

Table 1 shows the performance of a person re-identification apparatus and method utilizing the identity shuffle generative adversarial network (IS-GAN) technique according to this embodiment as compared to other previously known person re-identification techniques.

TABLE 1

| | | Market-1501 | | CUHK03 labeled | | CUHK03 detected | | DukeMTMC-reID | |
|---|---|---|---|---|---|---|---|---|---|
| Methods | f-dim | R-1 | mAP | R-1 | mAP | R-1 | mAP | R-1 | mAP |
| IDE [51] | 2,048 | 73.9 | 47.8 | 22.2 | 21.0 | 21.3 | 19.7 | — | — |
| SVDNet [52] | 2,048 | 82.3 | 62.1 | 40.9 | 37.8 | 41.5 | 37.3 | 76.7 | 56.8 |
| DaRe† [53] | 128 | 86.4 | 69.3 | 58.1 | 53.7 | 55.1 | 51.3 | 75.2 | 57.4 |
| PN-GAN [21] | 1,024 | 89.4 | 72.6 | — | — | — | — | 73.6 | 53.2 |
| MLFN [54] | 1,024 | 90.0 | 74.3 | 54.7 | 49.2 | 52.8 | 47.8 | 81.0 | 62.8 |
| FD-GAN [27] | 2,048 | 90.5 | 77.7 | — | — | — | — | 80.0 | 64.5 |
| HA-CNN [15] | 1,024 | 91.2 | 75.7 | 44.4 | 41.0 | 41.7 | 38.6 | 80.5 | 63.8 |

TABLE 1-continued

| Methods | f-dim | Market-1501 | | CUHK03 | | | | DukeMTMC-reID | |
| | | | | labeled | | detected | | | |
| | | R-1 | mAP | R-1 | mAP | R-1 | mAP | R-1 | mAP |
| --- | --- | --- | --- | --- | --- | --- | --- | --- | --- |
| Part-Aligned[†] [23] | 512 | 91.7 | 79.6 | — | — | — | — | 84.4 | 69.3 |
| PCB [11] | 12,288 | 92.3 | 77.4 | — | — | 59.7 | 53.2 | 81.7 | 66.1 |
| PCB + RPP [11] | 12,288 | 93.8 | 81.6 | — | — | 62.8 | 56.7 | 83.3 | 69.2 |
| HPM [48] | 3,840 | 94.2 | 82.7 | — | — | 63.9 | 57.5 | 86.6 | 74.3 |
| MGN[†] [12] | 2,048 | 95.7 | 86.9 | 68.0 | 67.4 | 66.8 | 66.0 | 88.7 | 78.4 |
| MGN[†, *] [12] | 2,048 | 94.5 | 84.8 | 69.2 | 67.6 | 65.7 | 62.1 | 88.2 | 76.7 |
| IS-GAN | 2,048 | 95.0 | 86.1 | 72.5 | 70.0 | 70.2 | 66.3 | 90.0 | 78.1 |

Table 1 shows the results of person re-identification for three types of data sets, namely the Market-1501 data set, the CUHK03 data set, and the DukeMTMC data set.

As can be seen from Table 1, the Market-1501 data set includes images with which person re-identification is relatively easier compared to the other two data sets, so that many of the existing techniques also show accuracy levels of 90% or higher, but for the CUHK03 data set and the DukeMTMC data set, the existing techniques show accuracy levels below 70% and 90%, respectively. In contrast, the person re-identification technique utilizing an identity shuffle generative adversarial network (IS-GAN) according to an embodiment of the disclosure shows accuracy levels of greater than or equal to 70% and 90%, respectively, even for the CUHK03 data set and the DukeMTMC data set. In other words, higher accuracy is provided for various data sets compared to existing techniques.

A method according to an embodiment of the disclosure can be implemented as a computer program stored in a medium for execution on a computer. Here, the computer-readable medium can be an arbitrary medium available for access by a computer, where examples can include all types of computer storage media. Examples of a computer storage medium can include volatile and non-volatile, detachable and non-detachable media implemented based on an arbitrary method or technology for storing information such as computer-readable instructions, data structures, program modules, or other data, and can include ROM (read-only memory), RAM (random access memory), CD-ROM's, DVD-ROM's, magnetic tapes, floppy disks, optical data storage devices, etc.

While the present disclosure is described with reference to embodiments illustrated in the drawings, these are provided as examples only, and the person having ordinary skill in the art would understand that many variations and other equivalent embodiments can be derived from the embodiments described herein.

Therefore, the true technical scope of the present disclosure is to be defined by the technical spirit set forth in the appended scope of claims.

What is claimed is:

1. A person re-identification apparatus comprising:
an identity feature extraction part configured to receive a plurality of images each including a person requiring re-identification, extract features related to an identity of a person included in each image according to a pattern estimation method learned beforehand, and obtain an identity-related feature vector for each image; and
a re-identification determination part configured to analyze a degree of similarity between an identity-related feature vector obtained for a base image including a search target from among the plurality of images and an identity-related feature vector obtained for another image to determine whether or not a person corresponding to the search target is included in the another image,
wherein the identity feature extraction part performs learning by back-propagating a loss obtained from determining a difference between a shuffle image and a learning image, the shuffle image generated by a concatenating, an inverse concatenating, and a synthesizing of identity-related feature vectors obtained from a plurality of learning images labeled with identifiers of persons included in the learning images and a plurality of identity-unrelated feature vectors obtained by extracting a feature unrelated to an identity of a person included in each image.

2. The person re-identification apparatus of claim 1, wherein the identity feature extraction part performs learning in a learning system for learning the identity feature extraction part,
and the learning system comprises:
a non-identity feature extraction part configured to receive a plurality of learning images labeled with identifiers of a same person and extract a feature unrelated to an identity of a person included in a learning image to obtain an identity-unrelated feature vector;
a feature inversion concatenation part configured to generate concatenation feature vectors by concatenating identity-related feature vectors and identity-unrelated feature vectors obtained from same learning images and inversely concatenating identity-related feature vectors and identity-unrelated feature vectors obtained from different learning images for the identity-related feature vectors and identity-unrelated feature vectors obtained for the plurality of learning images;
an image synthesis part configured to generate the shuffle image by receiving and synthesizing the concatenation feature vectors;
a domain identification part configured to determine whether or not the shuffle image is a synthesized image; and
an error backpropagation part configured to perform backpropagation with a loss occurring in the identity feature extraction part, the non-identity feature extraction part, and the image synthesis part calculated as the difference between the shuffle image and the learning image.

3. The person re-identification apparatus of claim 2, wherein the feature inversion concatenation part partitions each of the identity-related feature vectors obtained from different learning images into predefined segment units, generates partial shuffle-related feature vectors by shuffling a plurality of partitioned shuffle-related feature vectors, and concatenates the partial shuffle-related feature vectors and the identity-unrelated feature vectors to further generate partial shuffle-concatenation feature vectors, and the image synthesis part synthesizes the partial shuffle-concatenation feature vectors to generate a partial shuffle image.

4. The person re-identification apparatus of claim 3, wherein the feature inversion concatenation part obtains the partial shuffle-related feature vectors by selecting and exchanging partition-related feature vectors for a corresponding position from among a plurality of partition-related feature vectors in a predefined or a random order, the plurality of partition-related feature vectors obtained by partitioning each of a plurality of identity-related feature vectors.

5. The person re-identification apparatus of claim 3, wherein the error backpropagation part calculates the loss as a difference between the learning image from which the identity-unrelated feature vector is extracted and the shuffle image or the partial shuffle image.

6. A person re-identification method comprising:
a learning step of back-propagating a loss obtained from determining a difference between a shuffle image and a learning image, the shuffle image generated by a concatenating, an inverse concatenating, and a synthesizing of identity-related feature vectors obtained from a plurality of learning images labeled with identifiers of persons included in the learning images and a plurality of identity-unrelated feature vectors obtained by extracting a feature unrelated to an identity of a person included in each image; and
a re-identification step of receiving a plurality of images each including a person requiring re-identification and determining whether or not a same person is included in the plurality of images,
wherein the re-identification step comprises:
obtaining an identity-related feature vector for each image by receiving the plurality of images and extracting features related to an identity of a person included in each image according to a pattern estimation method learned in the learning step; and
analyzing a degree of similarity between an identity-related feature vector obtained for a base image including a search target from among the plurality of images and an identity-related feature vector obtained for another image to determine whether or not a person corresponding to the search target is included in the another image.

7. The person re-identification method of claim 6, wherein the learning step comprises:
obtaining an identity-unrelated feature vector by receiving a plurality of learning images labeled with identifiers of a same person and extracting identity-related feature vectors for the learning images and features unrelated to an identity of a person included in the learning images;
generating concatenation feature vectors by concatenating identity-related feature vectors and identity-unrelated feature vectors obtained from same learning images and inversely concatenating identity-related feature vectors and identity-unrelated feature vectors obtained from different learning images for the identity-related feature vectors and identity-unrelated feature vectors obtained for the plurality of learning images;
generating the shuffle image by receiving and synthesizing the concatenation feature vectors;
determining whether or not the shuffle image is a synthesized image;
determining an identifier of a person included in the shuffle image; and
performing backpropagation with a loss occurring during the obtaining of the identity-related feature vector and the identity-unrelated feature vector and during the generating of the shuffle image calculated as the difference between the shuffle image and the learning image.

8. The person re-identification method of claim 7, wherein the learning step further comprises:
partitioning each of the identity-related feature vectors obtained from different learning images into predefined segment units;
generating partial shuffle-related feature vectors by shuffling a plurality of partitioned shuffle-related feature vectors;
generating partial shuffle-concatenation feature vectors by concatenating the partial shuffle-related feature vectors and the identity-unrelated feature vectors; and
generating a partial shuffle image by synthesizing the partial shuffle-concatenation feature vectors.

9. The person re-identification method of claim 8, wherein the generating of the partial shuffle-related feature vectors comprises:
obtaining the partial shuffle-related feature vectors by selecting and exchanging partition-related feature vectors for a corresponding position from among a plurality of partition-related feature vectors in a predefined or a random order, the plurality of partition-related feature vectors obtained by partitioning each of a plurality of identity-related feature vectors.

10. The person re-identification method of claim 8, wherein the backpropagation comprises:
calculating the loss as a difference between the learning image from which the identity-unrelated feature vector is extracted and the shuffle image or the partial shuffle image.

* * * * *